(No Model.)
J. L. YOST.
VEHICLE WHEEL.
No. 312,692. Patented Feb. 24, 1885.
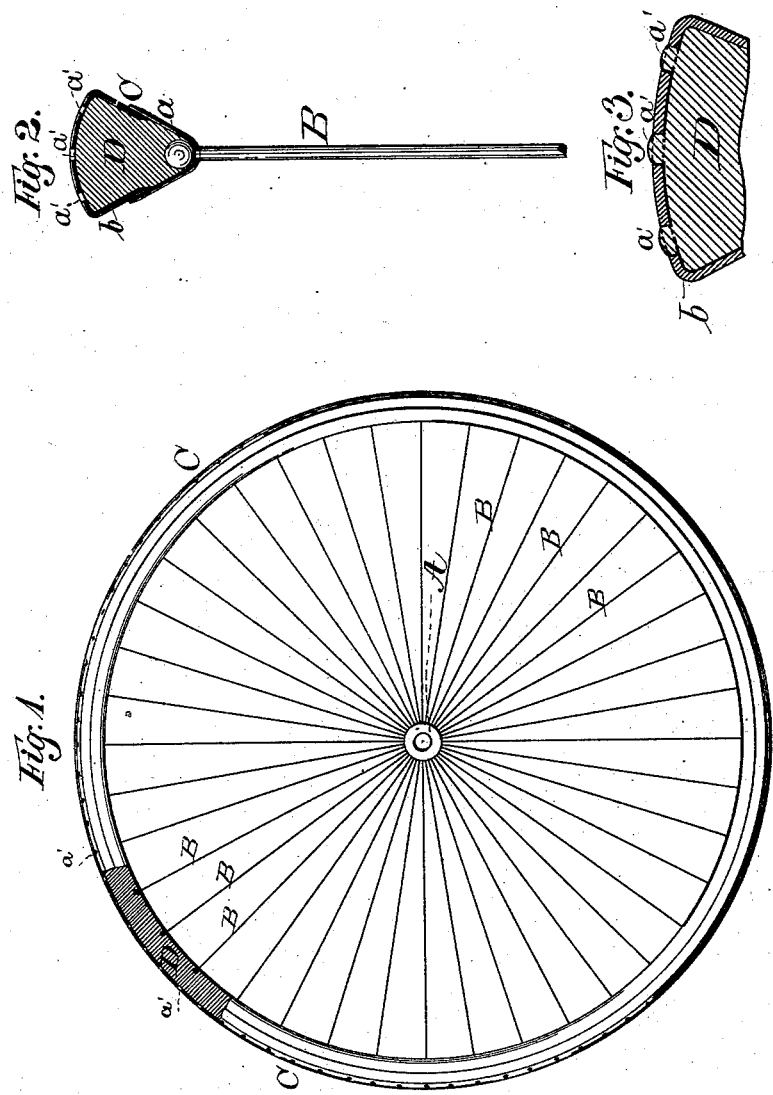
WITNESSES:
Gunvald Aas.
Joseph M. Rice
INVENTOR
Joseph L. Yost.
BY James A. Whitney
ATTORNEY

UNITED STATES PATENT OFFICE.

JOSEPH L. YOST, OF WALLINGFORD, CONNECTICUT.

VEHICLE-WHEEL.

SPECIFICATION forming part of Letters Patent No. 312,692, dated February 24, 1885.

Application filed November 20, 1884. (No model.)

*To all whom it may concern:*

Be it known that I, JOSEPH L. YOST, of Wallingford, in the county of New Haven and State of Connecticut, have invented certain Improvements in Combined Tires and Fellies for Vehicle-Wheels, of which the following is a specification.

This invention is more especially designed for wheels of "bicycles," so termed, but may also be advantageously applied to the wheels of other vehicles. Its object is to insure a wheel which will be cheap in construction and also very strong and durable, which will have a strong gripping hold or action on roadways of various kinds—as, for example, those varying from soft dirt to macadam or other hard roads—which will be sufficiently elastic, and which, when in use, will not flatten to retard its rotation.

My said invention comprises certain novel combinations of parts whereby the aforesaid advantages and others incidental thereto are effectually secured.

Figure 1 is a side view and partial sectional view of a bicycle-wheel constructed according to my said invention. Fig. 2 is a transverse sectional view on a larger scale, showing the peculiar characteristics of my said invention; and Fig. 3 is a transverse sectional view on a still larger scale, further illustrating some of the peculiarities of construction embodied in my said invention.

A is the hub of the wheel, of which the spokes are represented by the radial lines B B, &c.

C represents the combined tire and felly embraced in my said invention. The said combined tire and felly is composed of two parts, $a$ and $b$, each having the cross-section more fully illustrated in Fig. 2, and formed of sheet or other metal suitably wrought or brought to shape. The part $a$ is substantially triangular in cross-section, with the apex of the angle more or less rounded, and provided with any suitable number of holes or openings to receive the outer ends of the spokes B, the latter being headed at their extremities and within the parts $a$, so that when strained to their places in connection with the hub the said spokes will be suitably held in position. These spokes may of course be of any appropriate construction. The outer portion, $b$, has substantially the form more fully represented in Fig. 2, its sides inclining inward in such manner as to be lapped within the coincident and contiguous edges of the inner part, $a$, so that the contiguous edges of the two parts $a$ and $b$ may be soldered or brazed together. These parts $a$ $b$ constitute an annular shell, within which is placed a filling or packing, D, which may be of any suitable elastic or semi-elastic, or even non-elastic but partially yielding, material, but which is preferably made of india-rubber duly inserted in place and more or less compressed within the two parts $a$ $b$. This internal packing, D, should of course be inserted in due position prior to brazing or attaching the two parts together. The outer surface or perimeter of the shell formed by the parts $a$ $b$, as just explained, is provided at intervals with any desired number of openings, $a'$. These openings $a'$ furnish means by which the said surface may secure a firmer and securer hold upon the roadway traversed than would be possible with a uniform smooth surface throughout said perimeter. The internal packing, D, being compressed between the said parts $a$ $b$, as above set forth, and, especially when made of india-rubber, having a tendency to press outward into or through the openings $a'$, it follows that while the material of the packing D yields at the said opening when subjected to pressure from without—as, for example, by the earth or material of the roadway traversed thereby—permitting a more secure grip of the wheel upon the roadway, and in the same degree providing against the slipping of the wheel, yet as the latter, by its continued rotation, brings the said openings $a'$ successively away from the roadway traversed, the outward pressure of the packing D through said openings ejects all sand, dirt, and other extraneous material from the openings, thereby preventing them from becoming choked or clogged. By this means the perimeter or gripping-surface of the wheel is always kept in condition for the most efficient action upon the roadway traversed.

It will be observed that in point of mechanical construction the combined tire and felly constructed as described is mechanically considered an annular boxed girder, and has not only the strength peculiar to the boxed girder, but that which arises from the supporting and strengthening action of the compressed internal packing, D, and, while possessing the slight degree of elasticity especially desirable in a bicycle-wheel, is not sufficiently yielding to permit the wheel to appreciably flatten at the point of contact with the roadway traversed, which, if suffered to occur, would have the same effect. even upon a level roadway, as moving uphill.

As concerns the principal feature of my said invention, the details of construction may be varied within wide limits. Thus, for example, the shape in cross section thereof may be modified at will.

What I claim as my invention is—

1. A combined tire and felly for vehicle-wheels, which consists, essentially, of a hollow annulus provided with an internal compressed or elastic packing, substantially as and for the purpose herein set forth.

2. A combined tire and felly for vehicle-wheels, consisting of the following elements, to wit: an inner part, $a$, and outer part, $b$, brazed or otherwise suitably secured together, and an internal compressed or elastic packing, D, inclosed within said parts, all substantially as and for the purpose herein set forth.

3. A combined tire and felly for vehicle-wheels, composed of an outer part, $b$, having openings $a'$, an inner part, $a$, brazed or otherwise secured to the part $b$, and an internal compressed or elastic packing, D, all substantially as and for the purpose herein set forth.

JOSEPH L. YOST.

Witnesses:
HENRY HERZ,
THOMAS H. LYNCH.